(12) United States Patent
Hertz et al.

(10) Patent No.: US 10,027,609 B2
(45) Date of Patent: Jul. 17, 2018

(54) EXPERIENCE REDIRECTION WITH INTERACTIVE FEATURE CHANGES

(71) Applicant: Comcast Cable Communications, LLC, Philadelphia, PA (US)

(72) Inventors: Adam Hertz, San Francisco, CA (US); Michael A. Chen, Wallingford, PA (US); Sree Kotay, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 854 days.

(21) Appl. No.: 14/313,524

(22) Filed: Jun. 24, 2014

(65) Prior Publication Data

US 2014/0379826 A1    Dec. 25, 2014

Related U.S. Application Data

(60) Provisional application No. 61/838,600, filed on Jun. 24, 2013.

(51) Int. Cl.
*G06F 15/16* (2006.01)
*H04L 12/58* (2006.01)

(52) U.S. Cl.
CPC ............ *H04L 51/046* (2013.01); *H04L 51/08* (2013.01); *H04L 51/12* (2013.01); *H04L 51/14* (2013.01); *H04L 51/18* (2013.01)

(58) Field of Classification Search
CPC ................................ H04L 51/12; H04L 51/14
USPC ............................................. 709/203–206, 246
See application file for complete search history.

(56) References Cited

U.S. PATENT DOCUMENTS

| | | | | |
|---|---|---|---|---|
| 8,103,724 B2* | 1/2012 | Dawson | ................. | H04L 12/58 709/206 |
| 8,250,152 B2* | 8/2012 | Cardona | ............... | H04L 51/063 709/206 |
| 9,208,316 B1* | 12/2015 | Hill | ........................ | G06F 21/566 |
| 2010/0095220 A1* | 4/2010 | Kassab | .................. | G06Q 30/02 715/745 |
| 2011/0218845 A1* | 9/2011 | Medina | .............. | G06Q 30/0208 705/14.11 |
| 2016/0112366 A1* | 4/2016 | Olsen | ...................... | H04L 51/32 709/206 |

\* cited by examiner

*Primary Examiner* — Bharat N Barot
(74) *Attorney, Agent, or Firm* — Banner & Witcoff, Ltd.

(57) ABSTRACT

A system and method are described for allowing users to forward a media content experience, such as an Internet site, to another computing device. The system may allow the user to select individual portions and elements of the site for forwarding, to customize the level and type of experience being forwarded. The selection of portions and elements may be made based on the capabilities of the other computing device, and the forwarding may be simultaneously made to multiple other devices, each with potentially different combinations of the portions and elements of the site. In some embodiments, a text message link service may be offered by a content ingestion computing device, whereby a user may simply text an address of a site to be forwarded, and in response the user may receive a text message containing a link to the content ingestion computing device with a parameter identifying the site to be forwarded.

19 Claims, 11 Drawing Sheets

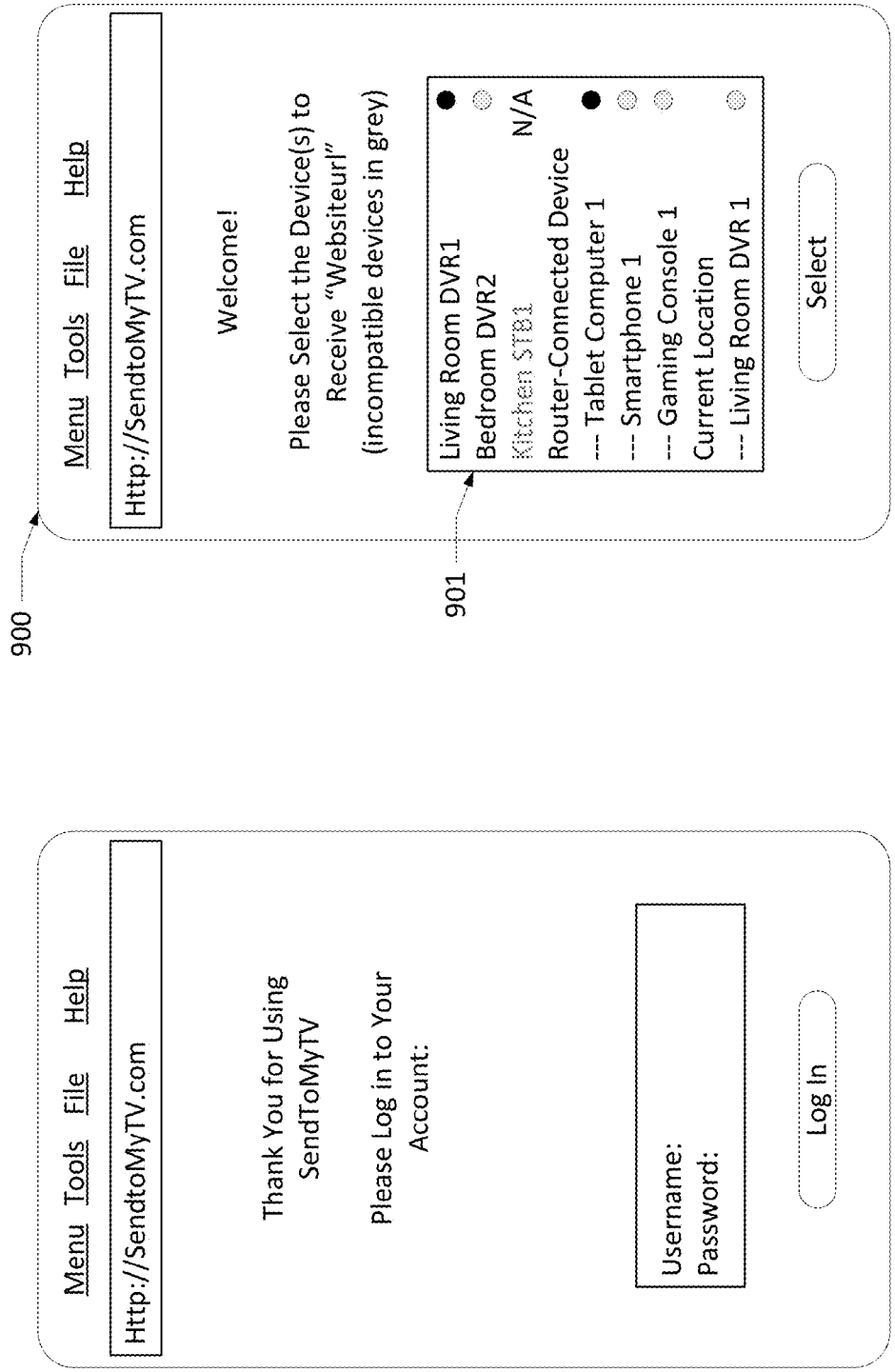

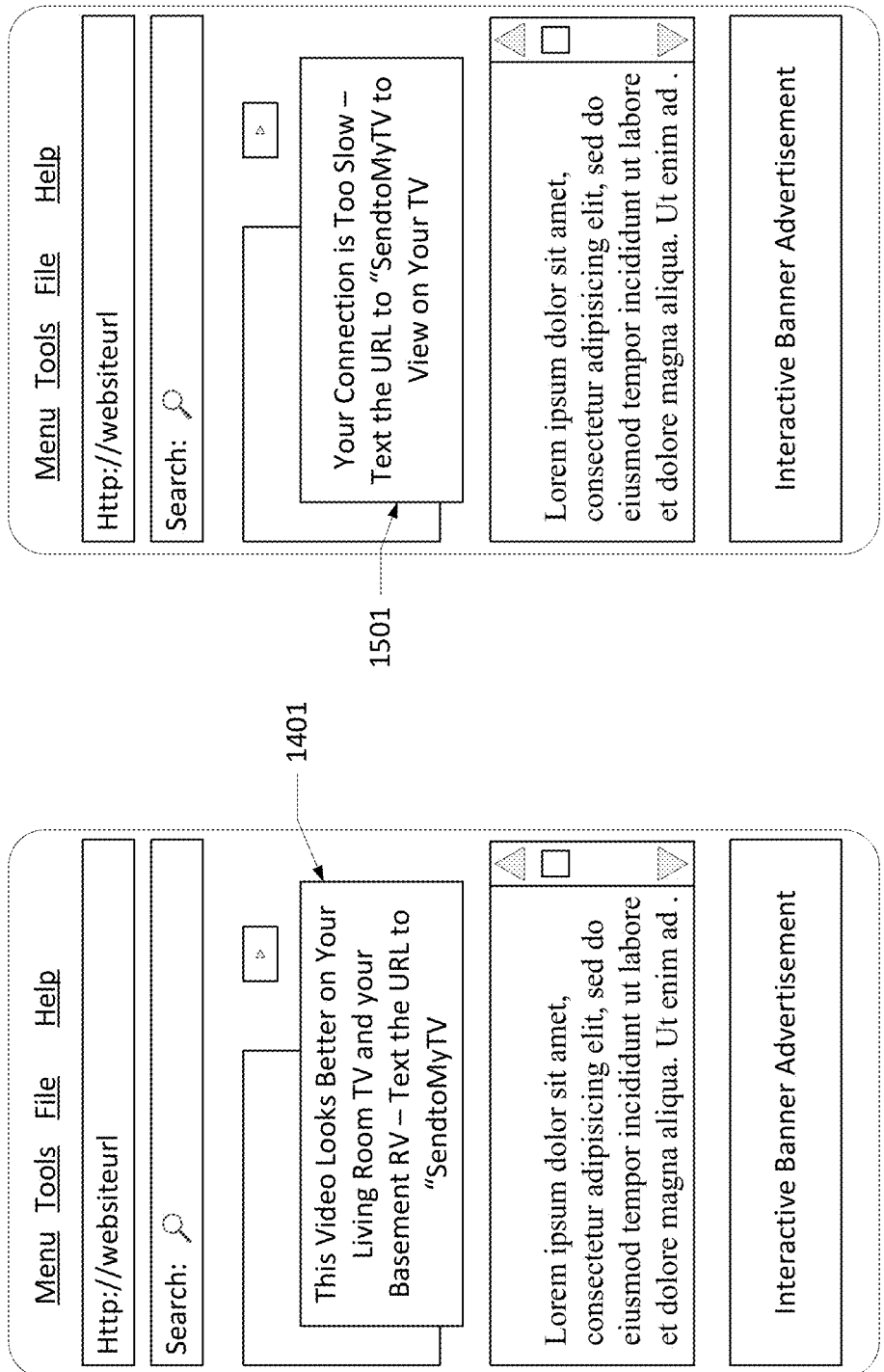

EXPERIENCE REDIRECTION WITH INTERACTIVE FEATURE CHANGES

CROSS-REFERENCE TO RELATED APPLICATIONS

The present application claims priority to U.S. Provisional Application No. 61/838,600, entitled "Experience Redirection" and filed on Jun. 24, 2013, the contents of which are hereby incorporated by reference.

BACKGROUND

Features herein relate to allowing users to view content, such as web content and Internet content, that is forwarded from one device, such as a tablet computer, smart phone, desktop computer, etc. to another device, such as a television set-top box, gateway, digital video recorder, or a television itself.

SUMMARY

The following summary is for illustrative purposes only, and is not intended to limit or constrain the detailed description.

Some embodiments may relate to an online service that lets users send content, such as an interactive Internet page or web page, from their desktop, tablet or smart phone to another device, such as web-enabled set top boxes in their household, so they can view it using other devices such as their TVs. The user may use a device, such as a tablet computer, to log in to a service that stores information identifying the various other devices that are associated with the user (e.g., the user's set-top boxes, televisions, computers, smart phones, etc.), and then may browse the Internet to identify content. When the user finds content that he/she would rather view on another device, the user can send a request to the service to redirect the content to the other device. The other device, which may be a separate set-top box having the hardware and/or software capabilities to process the redirected content, may then provide that content to the user.

In some embodiments, the forwarded content can be customized for presentation on the second device, such as a television, by removing interactive features such as the address bar, and adding a virtual keyboard accessible through a set-top box remote control. The changes may be made to present the content in a less cumbersome manner, as the other device might not have a full keyboard handy for further navigation of the content.

In some embodiments, the user forwarding the content may be provided with an option to specify the portions and features of content to be forwarded. For example, an Internet page may include embedded videos, interactive menus, selectable hyperlinks, and other features. When the user requests to forward the page to another device, the user may be given a prompt, asking the user to indicate which of the page's features should be redirected (e.g., just the videos, the full page without the menus, etc.). In some embodiments, the selection of features to include may be based on the capabilities of the receiving device. If the user's set-top device lacks a decoder for a video format in the page, or another resource needed for a feature of the page, then the user may be given the option of omitting the unsupported feature (or the feature may be automatically filtered out by the redirection server). Some Internet pages may have a corresponding version that is optimized for presentation on a user's television, and in such situations the redirection server may consult the metadata for the Internet page, determine that a television-optimized version is available, and may forward the optimized page instead.

In some embodiments, the forwarding of content can include a forwarding of an experience spanning multiple devices. For example, when a user initiates an application on a computer, the application may automatically launch a corresponding application on another device of the user.

A user experience may be provided when the user pre-installs a web application, such as a bookmarklet, on a first device such as a desktop, mobile device, tablet, etc. The user may then access web content on their first device, and when they want to send the content to a second device, such as their TV via their set-top box, they can invoke the bookmarklet. The bookmarklet may allow a service provider to present a login screen (if the user isn't already logged in to the service provider by virtue of the first device) and various notices as required; then the eligible devices for the logged-in context are presented for user selection. Code invoked by the bookmarklet may also be able to perform introspection on the web content to provide choices for how it should be sent to the TV; for example, an online video web page may present options to send the video, or the entire web page. The service then sends remote instructions to the set-top box guide to launch the container for the web content, which provides further instructions to render and control the web content on the TV. The same remote control functionality used for any remote application for the set-top box, including Internet-based remote controls, may be used to send user input events such as remote keypresses from the second screen.

There may also be a site with a form where the URL to send to the TV can be entered directly, in case the bookmarklet is not installed or is cumbersome to invoke. The site form may be used, along with integration of link shortening, to provide a convenient URL to share/email/etc. so that others that invoke the link can view it or send the web content to their own devices by logging in themselves—without having to know or type in the web content's URL.

Another form of invocation is to use the built-in sharing functionality in mobile/tablet browsers to launch a redirection application to forward a piece of web content, such as an Internet page. In some embodiments, a user may use a device's built-in text messaging function to forward an address (e.g., an Internet address or URL) to a predetermined text message destination (e.g., a phone number) corresponding to the redirection service. The redirection service may then send a responsive text message to initiate a user interface dialog for the forwarding of the web content. In some embodiments, the redirection service may receive the text message, and prepare a responsive message that contains a new URL, which can include a link to a web-based redirection page, and may include an identification of the redirected Internet page as a parameter to be passed to the web-based redirection page. Selection of the URL may initiate a dialog in which the user may log into the redirection server, select a target device from the user's devices, and select the features to be forwarded. By embedding this in a response text message, the service allows the user to forward the message to friends, who may each select the URL and each initiate a forwarding operation to their own respective devices.

In some embodiments, the forwarding can be done automatically as the user navigates content. For example, the user may be accessing Internet sites from a device that lacks capabilities, such as network connection bitrate, display resolution, etc., that are needed or desired by a particular Internet site. The site's metadata may indicate requirements for an optimal experience, and if the user's device determines that it lacks one or more of the requirements, it may automatically initiate a forwarding to another one of the user's devices, which may have the missing functionality. For example, the user's television may have a larger display resolution, and the device may determine that the Internet page should best be viewed on the television. The user may be given a prompt, inquiring as to whether the user would prefer to view the content on another one of the user's devices for a better experience. The user may also be presented with a list of devices, and a corresponding listing of the features that can, or cannot, be supported on each.

The content redirection can also be initiated from the television. For example, the user may access content from the set-top box, and press a button to request that the content be forwarded to the user's smart phone or tablet computer.

The summary here is not an exhaustive listing of the novel features described herein.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIGS. 4-15 illustrate various user interface screens that may be presented to users according to various features and embodiments described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
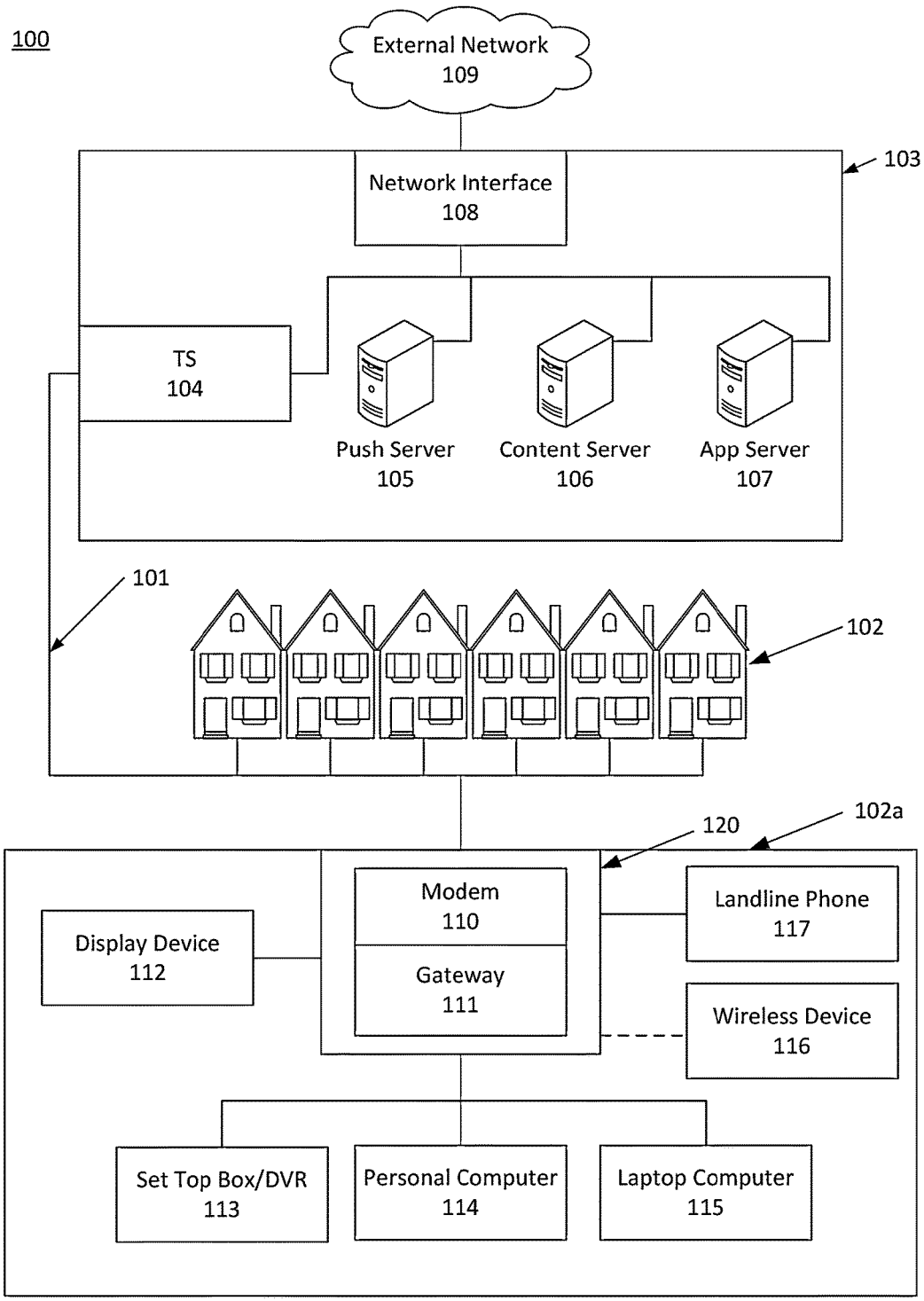
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
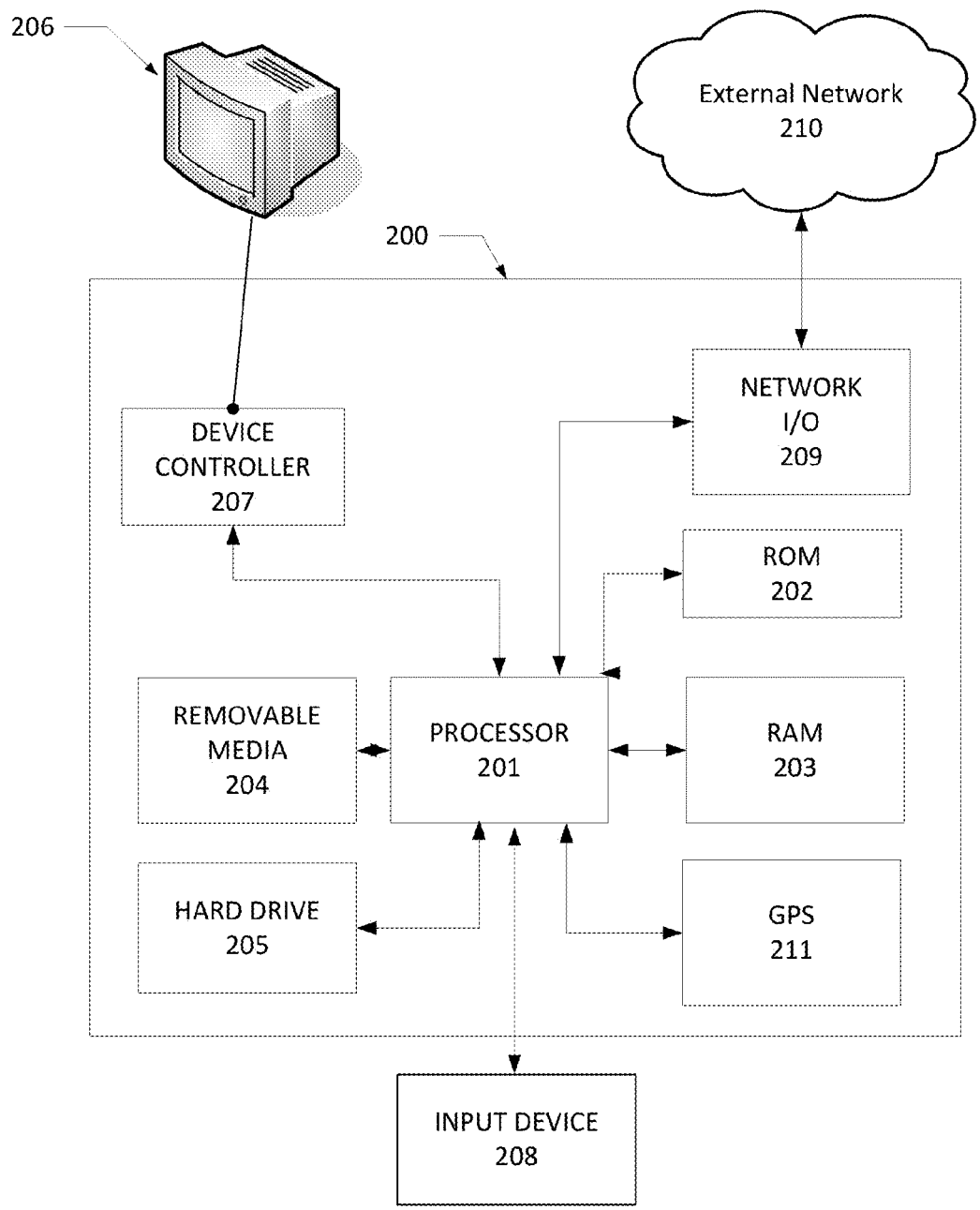
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
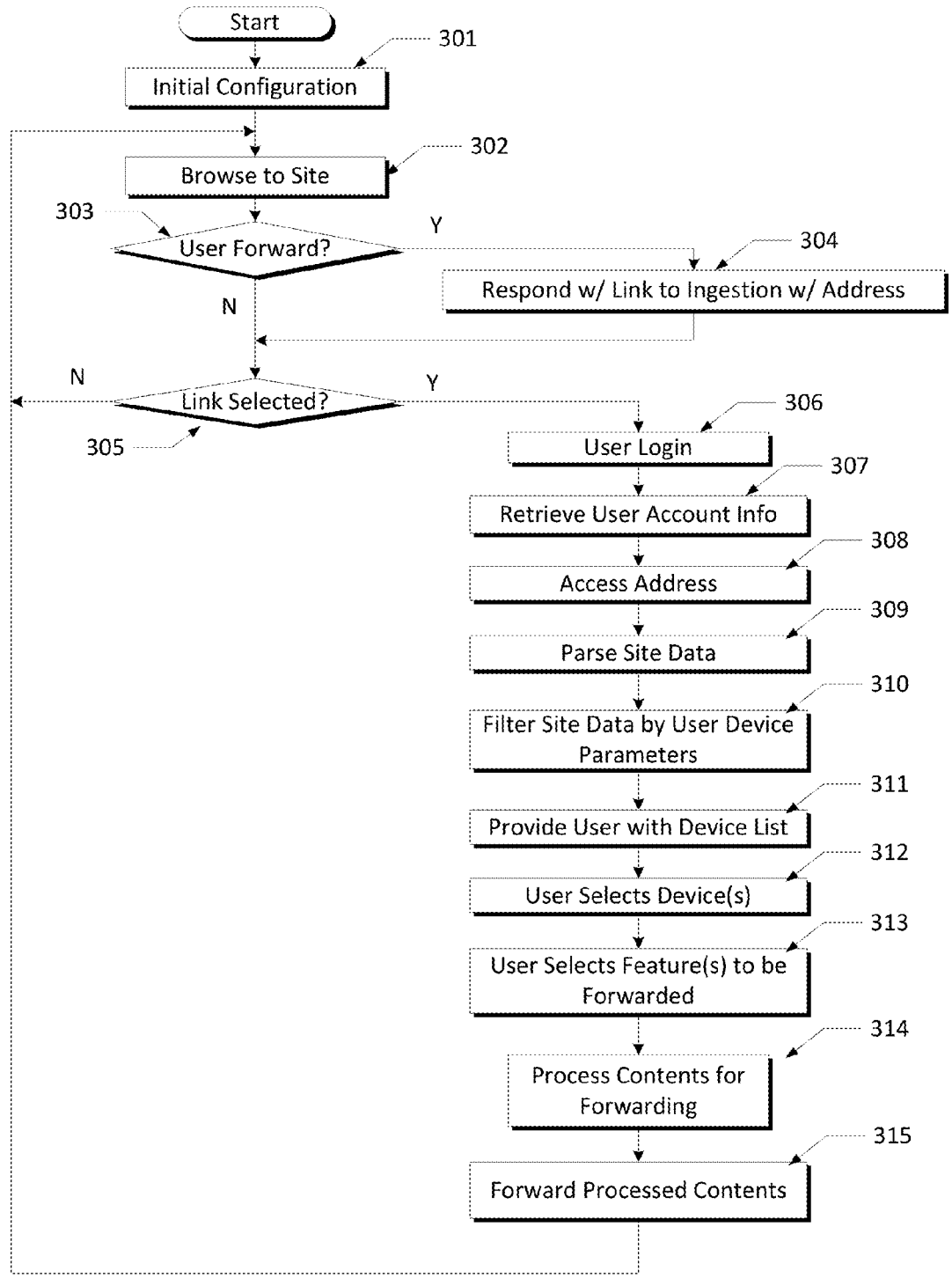
FIG. 3 illustrates an example process employing features described herein.

FIG. 3 illustrates an example process flow employing features described herein. The steps in the process may be performed by any desired computing device, such as a smartphone (e.g., wireless device 116), a gateway 111, a content server 106, an application server 107, etc. In the FIG. 3 example, a user may be using a smartphone 116 to surf the Internet, and may wish to forward a particular Internet page for consumption on a television (e.g., display device 112 via the gateway 111) or presentation via a STB/DVR 113.

Beginning in step 301, the initial configuration of the system herein may be performed. This initial configuration may include a variety of actions. For example, a bookmarklet application or plug-in may be installed into the Internet browser(s) of the user's device, such as the user's smartphone 116. The bookmarklet application may provide an easy command (e.g., a browser menu command, onscreen button, etc.) that allows users to quickly mark a currently-viewed Internet page for forwarding to another device. The initial configuration may also include establishing the user's account with a content service (e.g., creating an account, with username and password or other security, to allow the user to consume content on devices such as the STB/DVR 113) which may be, for example, a service operated by the content server 106 that provides streaming video content to the user's authorized devices. On the topic of authorized devices, the initial configuration may also entail registering the STB/DVR 113, computers 114/115, wireless devices/smartphones 116, and any other device that is serviceable by the content service, with the content server 106. This device registration may include providing the content server 106 with address information for the devices (e.g., a physical address, media access control (MAC) address, etc.), information identifying the device's capabilities (e.g., types of user interaction inputs/outputs available, memory size, processor type, form factor, display size and resolution, number of speakers, etc.).

Another initial configuration activity may be the establishment of a content ingestion computing device, which may be part of the content server 106 (or another server 106/107). As will be discussed further below, the content ingestion computing device may receive and respond to user requests to have Internet content taken in and prepared for delivery on the content service offered by content server 106. Such ingestion of content may include, for example, converting the format of the Internet content into a format that is compatible with the content server 106 and user devices (e.g., STB/DVR 113). Establishing the content ingestion computing device may also include defining how a user is to supply forwarded Internet content to the content ingestion computing device. For example, if text messaging is an option, then the content ingestion computing device may be assigned a text messaging address or telephone number, to which users can send uniform resource locator (URL) links to sites that the user would like to have ingested into the content service for consumption on another device, such as the STB/DVR 113.

Figure 4:
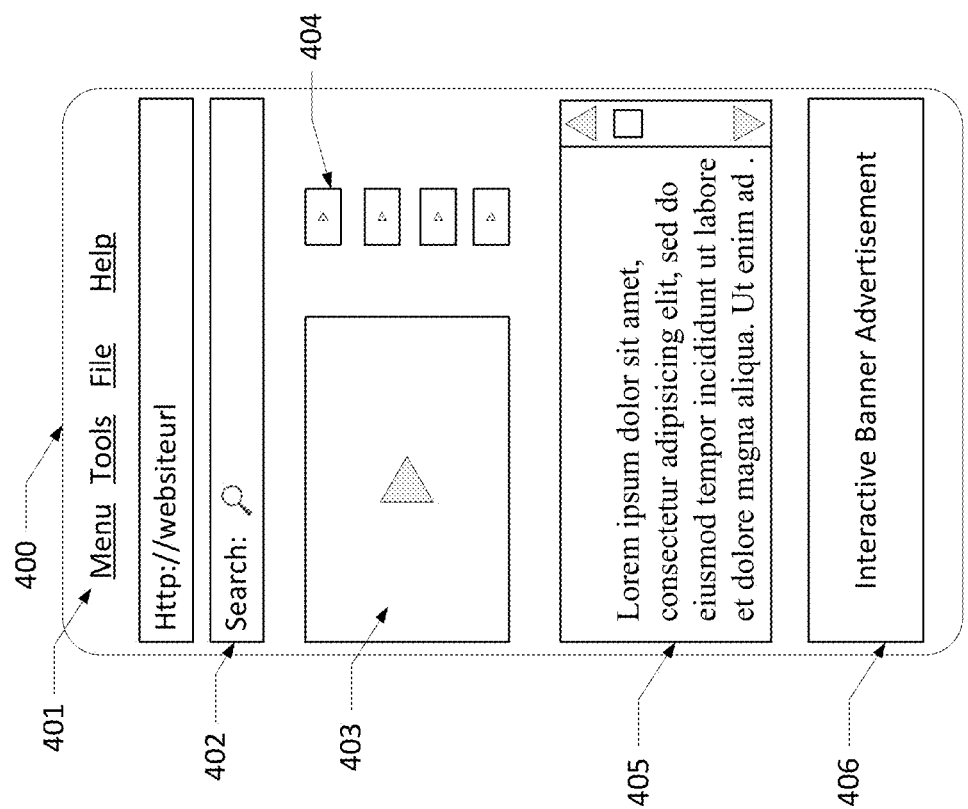

In step 302, the smartphone 116 (or other device) may be used to navigate to media content, such as an Internet site. FIG. 4 illustrates an example browser display 400 of an Internet site. The site may include various features, such as an interactive menu 401, a text entry search box 402 for allowing users to enter text search terms, a streaming video window 403 that may provide a first video stream, one or more secondary video stream icons 404 representing additional videos that the user may select (e.g., by tapping or clicking) to view, a scrollable text window 405 containing, for example, text description accompanying the first video stream, an interactive banner advertisement 406 that the user may click (or tap) to browse to a different site and/or see additional information in a pop-up window, and any other desired type of Internet page object (e.g., icons, buttons, etc.). In some embodiments, as the user is browsing the Internet page, the user may occasionally decide that some of the Internet content would be better consumed on a different device. For example, the user may decide that the first video stream should be viewed on the user's high-definition television instead of the smartphone 116 display.

Figure 5:
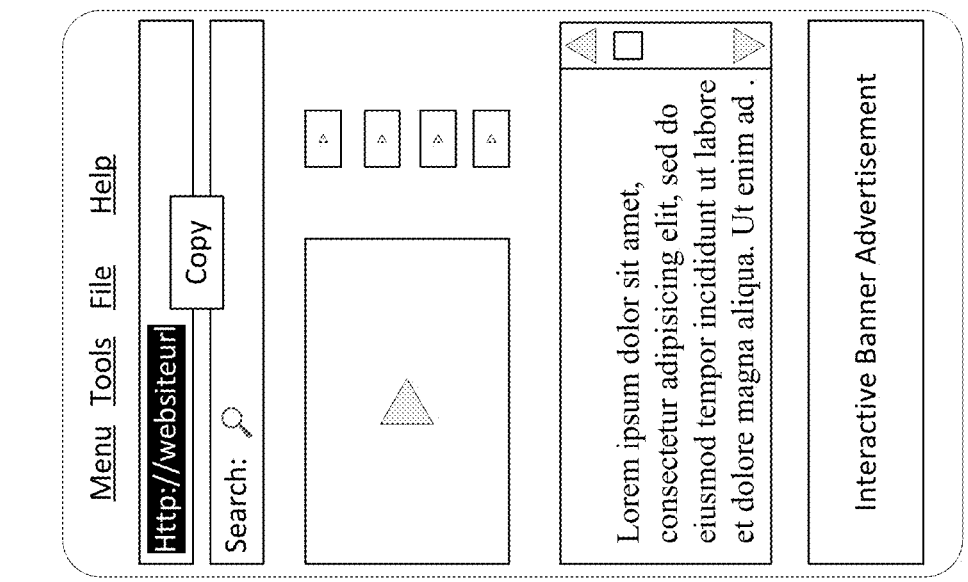
Figure 6:
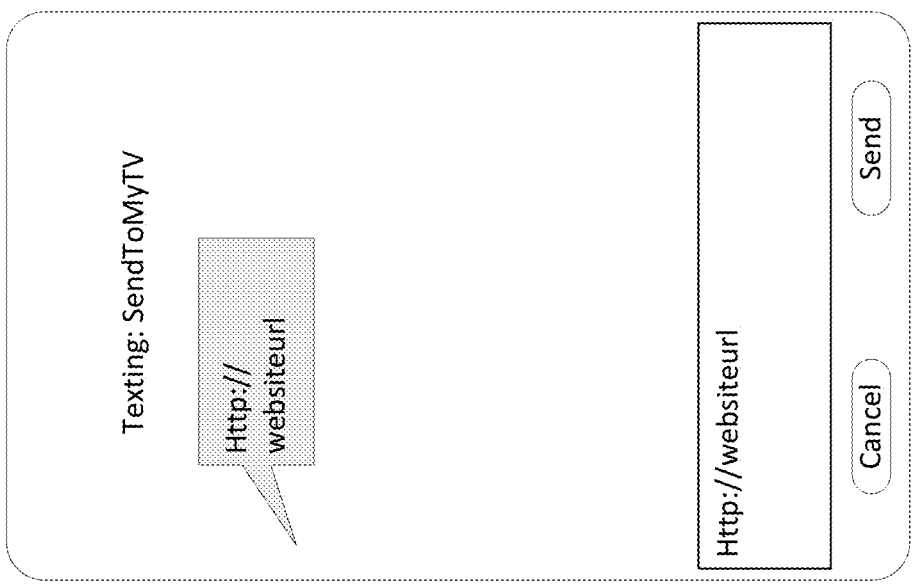

If the user wishes to forward the website for consumption on another device, then there are several options the user can pursue. As shown in FIG. 5, one option may involve sending a text message containing the URL of the Internet site that is to be forwarded. FIG. 5 illustrates that the user may copy the address from the browser display 400, and in FIG. 5, the user may simply send that URL as a text message to a predetermined address of the content ingestion computing device. As noted above, that address may simply be a phone number, although in FIG. 6, the address is illustrated in a text format "SendToMyTV."

In step 303, the content ingestion computing device may determine whether it has received such an incoming message from someone wishing to forward an Internet link. If such a request has been received, then in step 304, the content ingestion computing device may generate a response message containing a link to an Internet site of the content ingestion computing device, and with a parameter of the address that was included in the user's text message. The address in the response message may be a complete copy of the address from the text message, or it may be a modified version of the address. In some embodiments, the content ingestion computing device may generate a shortened version of the address using any desired address shortening service.

Figure 7:
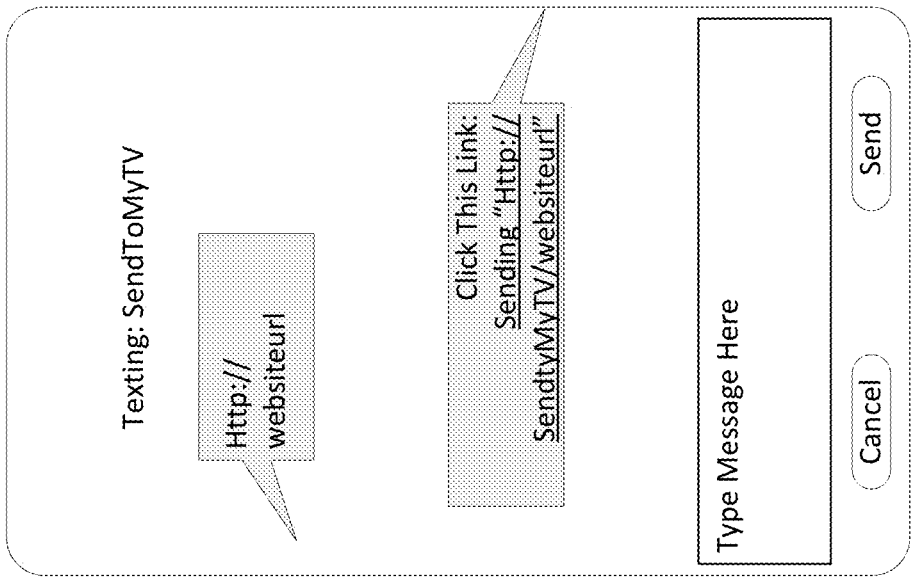

The response message may be as shown in FIG. 7, and the included link may be selectable by the user to cause the Internet site's content to be ingested by the content service for consumption by the user on, for example, the STB/DVR 113. The message may also be forwarded by the user to anyone that the user wishes to share the Internet content with. For example, the user can forward the text message to several friends, and each of the friends may also click on the link to have the content ingested by the content service for their own consumption.

After receiving the response, the user can select the link contained in the response, and be taken to a login page of the content ingestion computing device. In step 305, if the user (or any recipient of the response message) has selected the link, then in step 305, the user's browser will request access to the link, and the request is received at the content ingestion computing device. In step 305, the content ingestion computing device may determine that a user has clicked on or selected a link to the content ingestion computing device's address, and in step 306 the content ingestion computing device may provide the requesting browser with a login page, as shown in FIG. 8, and the user may provide login credentials to use the content service.

After successful login (failed login may simply result in an error message and exiting the process), the content ingestion computing device may retrieve the user's account information in step 307. The account information may identify the various devices that were registered with the user's account in the initialization discussed above. The information identifying the devices may include information identifying the capabilities of the devices, as noted above, and this capability information will be used further below.

In step 308, the content ingestion computing device may access the address contained in the link (e.g., the address of the Internet site that the user wishes to forward), and retrieve the requested Internet site and the site's associated metadata.

In step 309, the content ingestion computing device may then parse the retrieved data, and identify the various components of the Internet page. The identification may include identifying interactive components such as menu options, buttons, text boxes, etc. The identification may also include identifying streaming video on the site, such as the first video window 403 and additional video windows 404. The information for these video windows may identify the window parameters (e.g., size, resolution, color palette, encoding format, playback parameters (e.g, automatic playback, play upon selection, etc.) etc.), and may also include information identifying the underlying video itself (e.g., the source of the video, characteristics of other versions of the video that are available, required data transmission bandwidth for different versions, etc.). The information may also indicate types of user interaction that are permitted for the various elements of the site (e.g., clickable, selectable items, etc.). As a result of the parsing, the content ingestion computing device may generate a data file identifying the various portions of the site and their parameters. This data file may then be used to allow the user to specify which portions of the Internet site should be forwarded, and which portions should be ignored or omitted from the forwarding.

In step 310, the content ingestion computing device may filter the Internet site's data by the various user device parameters, to identify which portions of the site are usable by the various user devices. For example, a user device that does not have audio speakers will not be able to use the audio portion of the site. A user device that has or is connected to an Ultra-High-Definition video display may be able to handle the highest quality version of the videos on the site, while another device that only has a Standard Definition (SD) display may only be able to handle the lowest quality version of the videos on the site.

The user interaction capabilities of the user device may also be taken into account. For example, if the STB/DVR 113 remote control only has a numeric keypad, then portions of the site that require a pointer input (e.g., a FLASH game that requires users to click a mouse pointer on a moving ball) might be incompatible with the user device. A user device that lacks a keyboard input device may be incompatible with the text entry search box 402, or may require the assistance of a virtual keyboard software application on the user device for proper consumption. The content ingestion computing device may generate a table, such as the following, identifying the portions of the site and whether the portions are compatible (and the degree of their compatibility) with the various user devices associate with the user's account on the content service:

navigate the description box 405, and the Banner Ad column may indicate how the user can use the Banner Ad 406 (e.g., whether the user can use the ad's full features, or if only a one-way passive viewing version of the ad will be supported (e.g., if the device does not have a way for the user to interact with the banner ad)).

After filtering, the content ingestion computing device may determine which of the user's registered devices are compatible with the site being forwarded, and to what degree. In step 311, the content ingestion computing device may provide a response to the user's successful login, listing the user's registered devices and giving the user an option to indicate which one(s) of the devices should receive the forwarded content. FIG. 9 illustrates an example screen 900 with this response. The screen 900 may inform the user of the site that is being forwarded (thereby confirming for the user that the text message and address were successfully received), and may provide the user with a listing 901 of the various registered devices. The listing 901 may also indicate the degree to which the devices are compatible with the site. In the illustrated example, shading may be used to indicate whether a device is compatible or incompatible. In other embodiments, additional degrees of compatibility may be indicated (e.g., identifying a number of features of the site that are supported or not supported by the device, identifying an overall percentage of compatibility, etc.).

Figure 10:
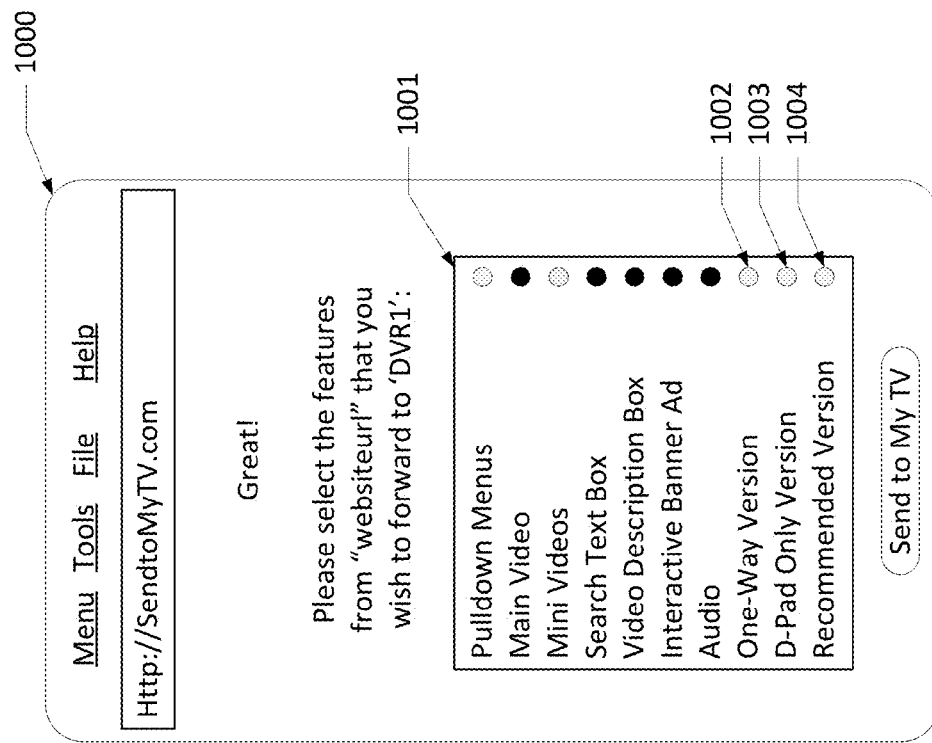

In step 312, the user may make selections to select one or more of the registered devices for receiving the forwarded site. Then, in step 313, the user may be asked to indicate which features of the site are to be forwarded to the selected devices. FIG. 10 illustrates an example of the display screen 1000 for this indication. In the screen 1000, the various features of the site may be listed 1001, and the user may select one or more to be forwarded to a device. The features may be identified by onscreen region (e.g., top-left, bottom-right, etc.), by feature type (e.g., menus, streaming video, etc.), by interaction type (e.g., features requiring touch input, features that don't require user input at all, features that need a keyboard or text entry, features that use directional D-pad input, etc.) by size, or in any other desired manner.

In some embodiments, the user may be given an option to select an overall experience level of the site to be forwarded, and request that the content ingestion computing device determine which individual features should be forwarded based on the requested experience level. The experience levels may be based on the type of experience that the user wishes to forward to the second device. For example, some

|  | Audio | 1st Video | 2nd Videos | Text Box | Description | Banner Ad |
| --- | --- | --- | --- | --- | --- | --- |
| DVR1 | 7.1 | UHD | UHD | T9 | D-pad | Full |
| DVR2 | 7.1 | UHD | UHD | T9, Voice | D-pad | Full |
| TABLET 1 | Stereo | HD | HD | Keyboard | Touch | Full |
| PHONE 1 | Mono | SD | SD | T9 | D-pad | One-way |
| CONSOLE 1 | 5.1 | HD | HD | Virtual | Gamepad | One-way |
| STB1 | No | SD | SD | No | No | One-way |

In the example table above, various devices may be identified by the degree to which they support certain features in the site. The audio features may be supported by 7.1 channel audio, 5.1 channel audio, stereo, mono, etc. The video columns may indicate the resolution capability of the devices, such as high definition, standard definition, etc. The text box column may indicate the type of user text entry supported by the different devices, from T9 entry, to voice, to keyboard or virtual keyboard on the user device. The description box column may indicate how the user can users may simply wish to forward a one-way, non-interactive version of a site to another device. This may be useful, for example, if the user simply wishes to view the currently-displayed text of the description box 405 on a larger screen, or if the user wishes to forward a streaming video to the larger screen of a television, and the user does not wish to bother with the interactive aspects of the site. As another example 1003, the user may wish to forward a version that is formatted to be navigated using only the UP/DOWN/LEFT/RIGHT keys of a directional pad (D-pad), and without the portions of the site that would require other types of inputs, such as a touch area, mouse input area, etc. In another example 1004, the user may not wish to bother with selecting individual features to forward, and may instead choose to have a recommended version of the site forwarded to each of the selected devices. The recommended version would be preparing by the content ingestion computing device using the selected devices' capabilities to select the features to include in, or omit from, the forwarded versions to those respective devices. In addition to a recommended version, the content ingestion computing device may also indicate whether the source of the site offered other versions of the site. For example, when accessing the site address 308 and parsing the site data 309, the content ingestion computing device may determine that the site offers another version for different device formats, or with different sets of features, and may offer those versions to the user as part of the offerings in step 313. For example, the list 1001 may include an entry for a "Television-Friendly Version Offered by Site Source," or "Mobile Device-Friendly Version Offered by Site Source."

The screen 1000 may be used multiple times, once each for the selected device(s) that are to receive the forwarded site. Alternatively, the screen 1000 can be used once to cover all of the selected devices, and devices that are incompatible with certain features need not receive those features (as will be explained below).

In step 314, the content ingestion computing device may then process the site's contents to carry out the forwarding of the site to the user's selected devices. The processing may depend on the different type of device to which the site is being forwarded, and the portions being forwarded. For example, interactive portions of the site may originally be written in Hypertext Markup Language (HTML). If the target device has the capacity to handle this format, and the user wishes to forward the full site's experience, then the processing in step 314 is minimal, and the address can be forwarded in step 315 to the target device, which can open up the address using its own HTML-enabled browser. If the target device has the necessary capability, but the user wishes to only forward a subset of the features on the site, then the step 314 processing may simply edit the site's data to omit the portions that the user does not wish to forward.

However, if the target device is less sophisticated, or lacks the necessary capacity to handle the original formatting of the site, then the forwarded site may need to be converted to a different coding format for operation on the different devices, such as a non-HTML-enabled STB/DVR 113, television, computer, etc. Streaming video portions may be converted from one video coding format to another (e.g., MPEG4 to MPEG2 for legacy devices, MPEG4 to WMV or other formats for other devices, etc.). In some embodiments, the version of the site that is ultimately provided to the user device may use dramatically different underlying code to provide the same or similar user experience. User interface protocols may be changed, to better fit the second device. For example, if the original site 400 was viewed on a smartphone with a touch screen interface, but is being forwarded to a television or STB/DVR 113 that lacks a touch screen interface, then certain user interface methods may be translated. For example, instead of the user touching a point on the screen to select a portion of the site 400 for interaction, the various portions may be sequentially highlighted by a cursor, which may be navigated using the UP/DOWN/LEFT/RIGHT buttons on an STB/DVR 113 remote control. Scrolling functionality may be remapped to use the inputs available on the STB/DVR 113 remote control, instead of inputs that were available on the original forwarding device (e.g., a mouse input, accelerometer, or other input might no longer be available).

Figure 11:
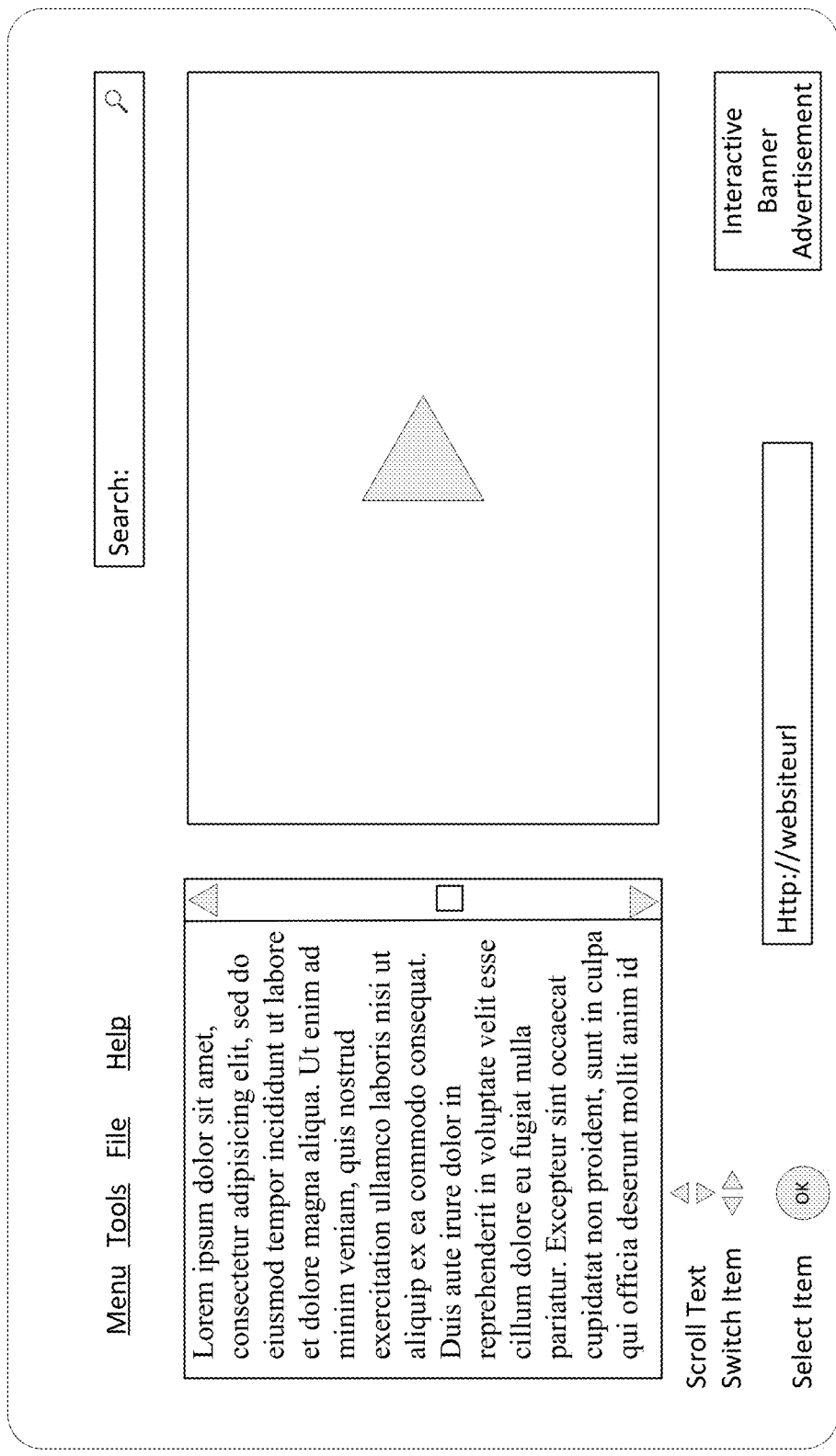

In some embodiments, the various elements in the site may be rearranged by the content ingestion computing device, to accommodate different viewing form factors of the different devices. FIG. 11 illustrates an example in which the various elements of the smartphone page 400 have been rearranged to a more landscape orientation 1100, which may be suitable for computers and televisions.

Figure 12:
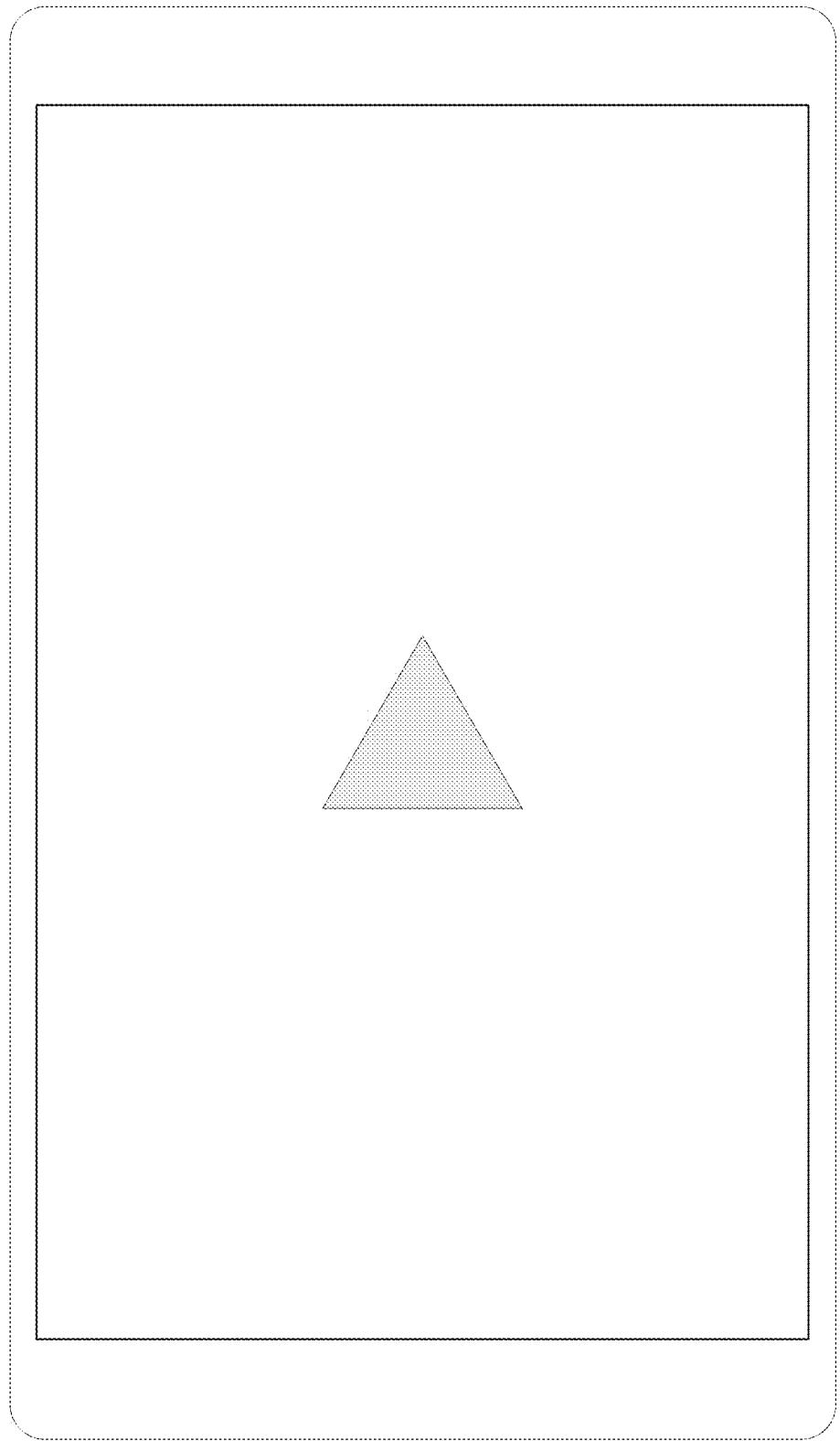

In some embodiments, the user experience may be condensed, to remove many of the features on the original site, and to focus on a selected few (or one) of the available features. For example, the user may request to forward just the main video 403 to a STB/DVR 113 for presentation on a television, and the resulting processing may provide just the stream of video in a full-screen presentation, as shown in FIG. 12.

The processing may result in generation of multiple different versions of the original site, corresponding to the different user devices to which the site is being forwarded, and in step 315, the versions may be transmitted to the user devices (or stored at some location, such as a memory in the content ingestion computing device) for later retrieval by the corresponding user device when the user is ready to consume the content on that device.

Figure 13:
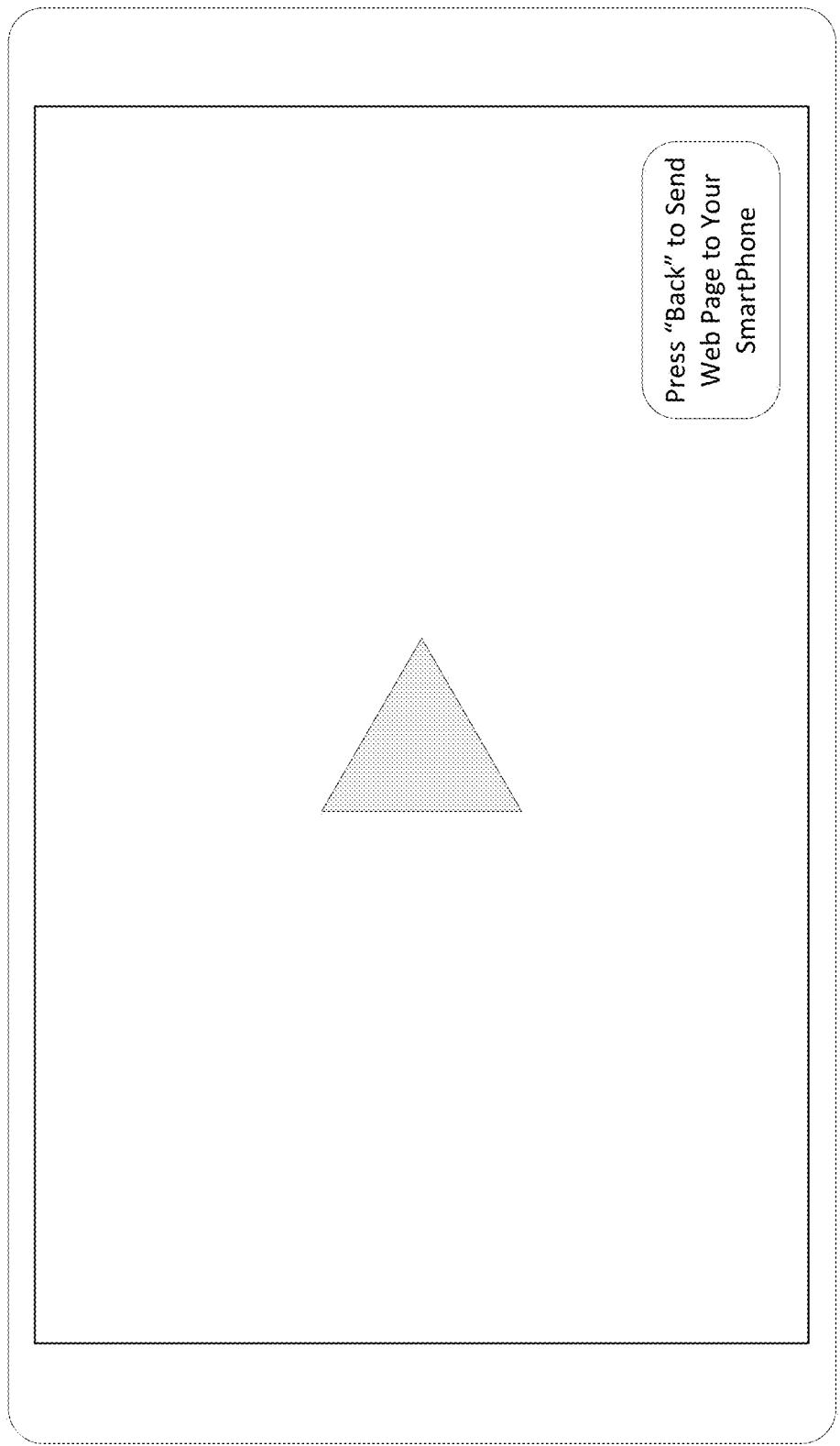

The example above forwarded an Internet site, but the features herein may be used to forward any desired user experience from one device to another. For example, a user may watch a movie on their television view a STB/DVR 113, and decide to forward the content for viewing on their smartphone. By pressing a predetermined button (e.g., the 'Back' button as shown in FIG. 13), the user can initiate the same forwarding steps, with appropriate modifications due to the different source. For example, pressing the button to forward a video content may cause the user's STB/DVR 113 to generate a forwarding request to the content ingestion computing device (e.g., via an upstream command from the STB/DVR 113), and the content ingestion computing device may respond in step 311 with the device selection described above, and the process may continue with corresponding steps as described above. Prior steps of the user login and accessing data may be optional, if that information is already known (e.g., if the content ingestion computing device has access to the account being used to supply the program to the STB/DVR 113).

In some embodiments, the user may be prompted with the option of forwarding the site, even before the user requests to forward the site. For example, and as shown in FIGS. 14 & 15, the user's browser or device may determine when the user's experience with a particular site or its contents would be better on a different device. For example, the user's smartphone's browser may be initialized with a plug-in that identifies the available video devices in the user's home, and their respective display capabilities (e.g., resolution, min/max display size, etc.), and may also be aware of the details of an Internet site's content that is being viewed on the smartphone. The site's metadata may indicate that larger, better resolution, versions of the video are available, and in such an instance the smartphone's browser may display a message 1401 suggesting that the user may wish to forward the content to their television or STB/DVR 113 for viewing. In alternate embodiments, the browser may detect when the data connection of the smartphone is resulting in jittery or imperfect playback of the content, and may display a message 1501 suggesting that the user may wish to forward the content to the user's television instead.

In some embodiments, the messages 1401/1501 may include an option of automatically prepopulating a text message with the address of the site being viewed, and may even automatically send the text message to the content ingestion computing device. Alternatively, the browser plug-in may redirect the browser to the address of the content ingestion computing device, taking the user to the FIG. 8 login and the step 306 process discussed above.

The login above may also vary depending on the site, or portion thereof, being forwarded. For example, the user may be asked to initially identify the portion(s) of the site to be forwarded (e.g., a browser plug-in may ask the user to identify the portions, using an interface similar to the interface 1000 discussed above), and/or the destination device (e.g., using an interface similar to interface 900 discussed above), and the content ingestion computing device may request different logins depending on the portion or the destination device. This may be useful, for example, if there are multiple content ingestion computing devices responsible for control over different ones of the user devices (e.g., one controlling the content on the user's STB/DVR 113, and another controlling content on a gaming console). The portions of the site may also require different logins. For example, the site's metadata may indicate that requests to forward the video 403 may need a login at a first content provider's site (e.g., the provider of the video), while requests to forward the banner advertisement 406 may need a login at a second content provider's site (e.g., the provider of the ad). When such a login is needed, the user's login in FIG. 8 may first go to the provider site to log in, and then when that login is completed, the user may be passed to the content ingestion computing device's own login for the eventual forwarding. These various logins may be performed in the background using pre-stored authentication data (e.g., cookies), to minimize disturbance to the user.

The FIG. 3 example includes sending a text message containing the address of the site. This approach may be useful if, for example, a dedicated plug-in is not or cannot be installed on the user's smartphone. For example, some smartphones might not easily allow the installation of browser plug-ins, but the smartphones may have system support for copying and pasting, and for sending text messages. Sending the text message, and then clicking the resulting link in the response text message, may be useful in such circumstances. However, in other embodiments, the user's smartphone (or other device on which the user requests to forward the site) may be loaded with software, such as a browser plug-in, that can obviate the need for the text message/linking In such embodiments, the plug-in may provide a command or button to automatically forward an Internet site being viewed, and in response to the user activating the command or button, the browser plug-in may automatically redirect the browser to the login screen in FIG. 8, discussed above, to begin the forwarding process.

In the FIG. 9 illustration, several of the user's registered devices are identified as being connected to a router. In some embodiments, the content ingestion computing device may initially communicate with an in-home device, such as a wireless router, at the user's premises, and learn the identity of one or more devices that are using the router for data access. Other devices, such as the Living Room DVR 1, might be directly connected to the content ingestion computing device (e.g., via a termination server at the local office 103), and their connection status and identity may already be known to the content ingestion computing device.

The examples above discuss forwarding content, such as an Internet site, from a first device to a different device. In alternate embodiments, the messaging can be used to trigger different applications on the target device. For example, the user of a first device may send a message (e.g., in step 303) to the second device, requesting invocation of an application from the first device to the second device. The second device may take the user through the login step 306 and ensuing steps to cause the application to execute on the second device. By going through the login, the application can be assured of the identity of the user at the second device, which can be helpful if the application involves the use of sensitive information.

In some embodiments, the user can forward the content to a device that is not associated with the user's account. For example, if the user is at a friend's house, and wishes to forward content to the friend's television, the user can forward the text message from step 304 to the friend, and when the friend selects the link, the friend can be prompted to log in in step 306. The forwarded link may include information identifying the user who forwarded the text message, and this information may be passed to the content ingestion computing device when the link is selected. When the friend logs in in step 306, the content ingestion computing device may obtain location information for the original user's smartphone (e.g., by requesting Global Positioning Information) and from the friend's device that is requesting the login, and confirm that the two are co-located. With the confirmation, the content ingestion computing device may then authorize the friend's devices to receive the forwarded content, for at least the duration that the user is at the friend's house (e.g., when the friend accesses the content, the content ingestion computing device, or any device managing the access to the content, may confirm the colocation before authorizing the access).

In some embodiments, the user can forward the text message to a friend without requiring the user's device to be co-located. In such embodiments, the link in the text message may simply identify the content itself, and take the friend (or whomever clicks on the link) to the login page for the content ingestion computing device.

The features described above are merely examples. The various steps and elements described may be rearranged, combined, divided, and/or removed as appropriate for a desired implementation, without departing from the spirit and scope herein.

We claim:

1. A method comprising:
providing, by a first computing device, a user with an option to forward a network site to a second device;
providing the user with an option to forward a modified version of the network site to the second device, wherein the modified version of the network site modifies or omits one or more interactive features of the network site; and
after a selection of the option to forward the modified version, forwarding the modified version of the network site to the second device,
wherein the providing the user with an option to forward a modified version of the network site to the second device comprises providing the user with an option of forwarding a directional pad navigation version of the network site, wherein the directional pad navigation version of the network site omits one or more features based on a determination of whether the one or more features are formatted for navigation using up, down, left, or right directional inputs.

2. The method of claim 1, further comprising:
preparing the modified version of the network site by identifying one or more user interaction capabilities of the second device, the one or more user interaction capabilities determined based on one or more of hardware or software capabilities of the second device; and
filtering the network site, based on the user interaction capabilities, to identify the one or more interactive features from the network site that are to be modified or omitted.

3. The method of claim 1, further comprising:
preparing the modified version of the network site by identifying one or more user interaction capabilities of the second device, and including, in the modified version of the network site, a modified user interface to accommodate interactive capabilities of the second device.

4. The method of claim 1, further comprising:
providing the user with a listing of a plurality of interactive features on the network site, and receiving user selection of one or more ones of the interactive features in the listing to be removed from the network site before forwarding the modified version of the network site to the second device.

5. The method of claim 1, further comprising:
requesting that the user provide login credentials to log in to a media service account of the user;
identifying one or more devices registered with the media service account; and
providing the user with an option to select one or more of the identified one or more devices registered with the media service account that are to receive the forwarded modified version of the network site.

6. The method of claim 1, wherein the providing the user with an option to forward the modified version comprises:
providing the user with an option of forwarding a non-interactive version.

7. The method of claim 1, further comprising:
providing the user with an option of omitting one or more pulldown menus from the network site when forwarding the modified version of the network site to the second device.

8. The method of claim 1, wherein the directional pad navigation version of the network site modifies one or more navigation features to be navigable using up, down, left, or right directional inputs.

9. An apparatus comprising:
one or more processors; and
memory, storing instructions that, when executed by the one or more processors, cause the apparatus to:
request that a user provide login credentials to log in to a media service account of the user;
identify one or more devices registered with the media service account;
provide the user with an option to forward a network page from a first device registered with the media service account to a second device registered with the media service account;
provide the user with an option to forward a modified version of the network page to the second device, wherein the modified version modifies or omits, based on a hardware user interface of the second device, one or more interactive features from the network page;
after a selection of the option to forward the modified version, forward the modified version of the network page to the second device; and
receive, from the second device, a user input associated with the forwarded modified version and associated with the hardware user interface of the second device.

10. The apparatus of claim 9, wherein the memory further stores instructions that, when executed by the one or more processors, cause the apparatus to:
prepare the modified version of the network page by identifying one or more user interaction capabilities of the second device, and filtering the network page based on the user interaction capabilities to identify the one or more interactive features from the network page that are to be modified or omitted.

11. The apparatus of claim 9, wherein the memory further stores instructions that, when executed by the one or more processors, cause the apparatus to:
prepare the modified version of the network page by identifying one or more user interaction capabilities of the second device, and including, in the modified version of the network page, a modified user interface to accommodate interactive capabilities of the second device.

12. The apparatus of claim 9, wherein the memory further stores instructions that, when executed by the one or more processors, cause the apparatus to:
provide the user with a listing of a plurality of interactive features on the network page, and receiving user selection of one or more ones of the interactive features in the listing to be removed from the network page before forwarding the modified version of the network page to the second device.

13. The apparatus of claim 9, wherein the memory further stores instructions that, when executed by the one or more processors, cause the apparatus to:
provide the user with an option to select one or more of the identified devices registered with the media service account that are to receive the forwarded modified version of the network page.

14. The apparatus of claim 9, wherein the memory further stores instructions that, when executed by the one or more processors, cause the apparatus to:
provide the user with an option of forwarding a non-interactive version of an interactive network page to the second device.

15. The apparatus of claim 9, wherein the memory further stores instructions that, when executed by the one or more processors, cause the apparatus to:
generate a table indicating whether one or more portions of the network page are compatible with user interaction capabilities of the second device.

16. A method comprising:
providing, by a first computing device, a user with an option to forward a network site to a second device;
providing the user with an option to forward a modified version of the network site to the second device, wherein the modified version of the network site modifies or omits, based on a hardware user interface of the second device, one or more pulldown menus from the network site;
after a selection of the option to forward the modified version, forwarding the modified version of the network site to the second device; and
receiving, from the second device, a user input associated with the forwarded modified version and associated with the hardware user interface of the second device.

17. The method of claim 16, further comprising:
preparing the modified version of the network site by identifying one or more user interaction capabilities of the second device, the user interaction capabilities determined based on one or more of hardware or software capabilities of the second device; and
filtering the network site to identify one or more interactive features incompatible with the user interaction capabilities.

18. The method of claim 16, further comprising:
providing, via an interactive user interface, the user with a plurality of interactive features on the network site; and
receiving, via the interactive user interface, user selection of one or more ones of the interactive features to be forwarded from the network site before forwarding the modified version of the network site to the second device.

19. The method of claim 16, further comprising:
determining, based on one or more user interaction capabilities of the second device, one or more interactive features of the network site to generate a recommended version of the network site for the second device.

* * * * *

UNITED STATES PATENT AND TRADEMARK OFFICE
CERTIFICATE OF CORRECTION

PATENT NO. : 10,027,609 B2
APPLICATION NO. : 14/313524
DATED : July 17, 2018
INVENTOR(S) : Hertz et al.

Page 1 of 1

It is certified that error appears in the above-identified patent and that said Letters Patent is hereby corrected as shown below:

In the Specification

Column 13, Line 49:
After "messaging/linking", please insert --.--

Signed and Sealed this
Sixteenth Day of October, 2018

Andrei Iancu
*Director of the United States Patent and Trademark Office*